United States Patent
Friesen et al.

(10) Patent No.: US 7,032,527 B2
(45) Date of Patent: Apr. 25, 2006

(54) VERTICAL POSITIONER FOR SEED PLANTER HAVING INTEGRAL LOCKING MECHANISM

(75) Inventors: Dick Friesen, Hepburn (CA); Calvin Greenstein, Saskatoon (CA)

(73) Assignee: CNH Canada, Ltd., Racine, WI (US)

( * ) Notice: Subject to any disclaimer, the term of this patent is extended or adjusted under 35 U.S.C. 154(b) by 14 days.

(21) Appl. No.: 10/731,361

(22) Filed: Dec. 9, 2003

(65) Prior Publication Data

US 2005/0120929 A1    Jun. 9, 2005

(51) Int. Cl.
*A01C 7/18* (2006.01)

(52) U.S. Cl. .......................... 111/62; 111/18; 172/462; 172/484

(58) Field of Classification Search .................. 111/62, 111/63, 66, 67, 68, 69, 926, 18, 22; 172/462, 172/484, 486, 488

See application file for complete search history.

(56) References Cited

U.S. PATENT DOCUMENTS

| | | | | |
|---|---|---|---|---|
| 4,116,140 A | * | 9/1978 | Anderson et al. | 111/136 |
| 4,307,674 A | * | 12/1981 | Jennings et al. | 111/164 |
| 4,311,104 A | * | 1/1982 | Steilen et al. | 111/194 |
| 4,977,841 A | * | 12/1990 | Truax | 111/62 |
| 5,163,518 A | * | 11/1992 | Foley | 172/462 |
| 5,511,498 A | * | 4/1996 | Lohrentz et al. | 111/191 |
| 5,515,929 A | * | 5/1996 | Schwitters | 172/674 |
| 5,529,128 A | * | 6/1996 | Peterson et al. | 172/145 |
| 6,109,193 A | | 8/2000 | Crabb et al. | |
| 6,401,638 B1 | | 6/2002 | Crabb et al. | |

* cited by examiner

*Primary Examiner*—Victor Batson
(74) *Attorney, Agent, or Firm*—Rebecca Henkel

(57) ABSTRACT

A seed planting assembly is provided having a plurality of planting units supported by a tool bar, each of which being operable to form a seed trench in soil, plant seeds in the seed trench, and close the seed trench. Each planting assembly is supported by the tool bar via a mounting assembly that can be actuated by a vertical positioner to raise and lower individual planting units.

10 Claims, 4 Drawing Sheets

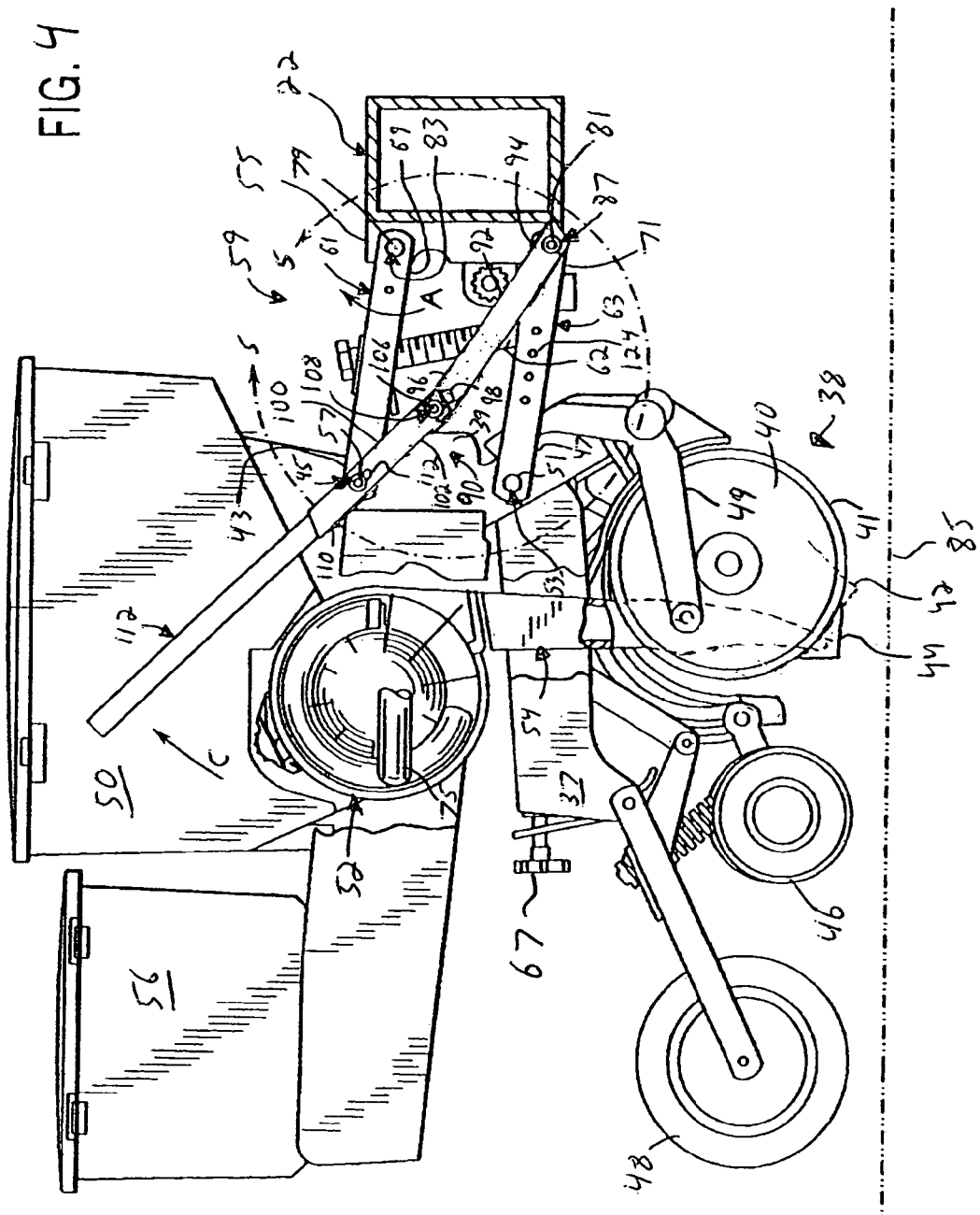

VERTICAL POSITIONER FOR SEED PLANTER HAVING INTEGRAL LOCKING MECHANISM

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

The present invention relates to seed planting assemblies in general, and in particular relates to a method and apparatus for selectively disengaging seed planting units of a seed planting assembly.

Seed planting units generally include a laterally extending tool bar that supports a plurality of parallel planting units (also known as row units). The tool bar is typically coupled to a tractor or like vehicle suitable for towing the planting assembly along a field that is to be cultivated. Each planting unit includes a device for opening a seed trench in the ground as the tractor draws the tool bar across a field to be seeded. Each planting unit further includes a seed meter to dispense seeds at a controlled rate into a seed trench as the meter is advanced above and along the seed trench during operation. One such seed metering assembly is described in U.S. Pat. No. 6,401,638 assigned to Case Corp., Racine, Wis., the disclosure of which is hereby incorporated by reference for the purpose of general background information. Generally seeds are delivered to the metering assembly from a seed hopper located on the planting unit or, alternatively, from a smaller container fed from a centralized large hopper used to feed all or a portion of the planting units. Each planting unit further includes a closing assembly that moves soil at the sides of the seed trench to close the seed trench over the planted seeds. Adjacent planting units are laterally spaced a sufficient distance to form seed trenches that are spaced a corresponding distance apart that is suitable for the type of seed being planted.

Air pressure differential seed meters, which are commonly known as air seed meters, are generally of two types, the first being a positive pressure type meter, and the second relying upon negative pressure or a vacuum. A positive pressure air seed metering mechanism includes a rotating disc defining apertures extending therethrough that are sized to retain one or more seeds to be planted. The metering mechanism is connected to an air mover that blows air into the seed chamber and onto the surface of the disc. The high pressure caused by the air mover creates a high pressure in the chamber that forces seeds from a seed mass into the apertures where they are retained for subsequent release into the seed trench as the seed member rotates. Vacuum seed meters typically include a vacuum source coupled to a separate chamber on the opposite side of the seed disc from the seed mass in the metering assembly. The vacuum pressure communicates through the disc apertures, and is sufficiently strong to draw the seed mass into the seed disc apertures. The seeds are held in the apertures until the disc rotates the seeds to the seed discharge area of the metering mechanism.

During a planting operation, the desired spacing between adjacent seed trenches can vary depending upon the type of seed being planted. In a typical arrangement, all thirty-one planting units are spaced along the toolbar at a sufficient distance to accommodate seeds that can be planted in narrowly spaced adjacent seed trenches to maximize the crop yield. Examples of such seeds include soybeans. Other types of seeds, such as corn, require that the distance between adjacent seed trenches be increased. The increased distance is typically accomplished by disengaging every other seed planting unit, thereby doubling the lateral distance between adjacent seed trenches that are created during operation.

Seed planting units are conventionally disengaged by removing the corresponding metering assemblies from the air mover source and, if necessary, operatively disconnecting the metering assembly from the seed hopper. Next, seed planting units can be selectively raised by rotating each unit about the tool bar and above ground level to prevent the planting unit from forming a seed trench. A locking mechanism is present to retain the planting unit in its raised position. Unfortunately, planting units typically weigh hundreds of pounds, making it difficult, if not impossible, to manually lift each unit to its raised position. Mechanical lifts are therefore sometimes employed, whose operation can be cumbersome and time consuming, especially when lifting up to fifteen planting units in a given seed planting assembly.

What is therefore needed is a method and apparatus for selectively raising and locking a planting unit in a more time efficient and less labor-intensive manner than conventionally achieved.

SUMMARY OF THE INVENTION

In accordance with one aspect of the present invention, a seed planting assembly is provided including a laterally extending toolbar and a planting unit including a planting unit frame supported by the tool bar. The planting unit frame carries a seed trench opening assembly operable to create a seed trench, a seed delivery assembly delivering seeds into the seed trench, and a seed trench closing assembly operable to close the seed trench. A mounting assembly pivotally links the planting unit frame with the tool bar. The mounting assembly permits the planting unit to raise and lower with respect to the tool bar. A vertical positioner is provided including a first linkage connected to the mounting assembly and a second linkage connected to the first linkage at a positioner joint and further in communication with the frame. The second linkage can be actuated to raise the planting unit.

The foregoing and other aspects of the invention will appear from the following description. In the description, references made to the accompanying drawings which form a part hereof, and in which there is shown by way of illustration, and not limitation, a preferred embodiment of the invention. Such embodiment does not necessarily represent the full scope of the invention, however, and reference must therefore be made to the claims for interpreting the scope of the invention.

BRIEF DESCRIPTION OF THE DRAWINGS

Reference is hereby made to the following figures in which like reference numerals correspond to like elements throughout, and in which:

FIG. 4 is a perspective view of a handle portion of the vertical positioner illustrated in FIG. 3.

DETAILED DESCRIPTION OF THE PREFERRED EMBODIMENT

Figure 1:
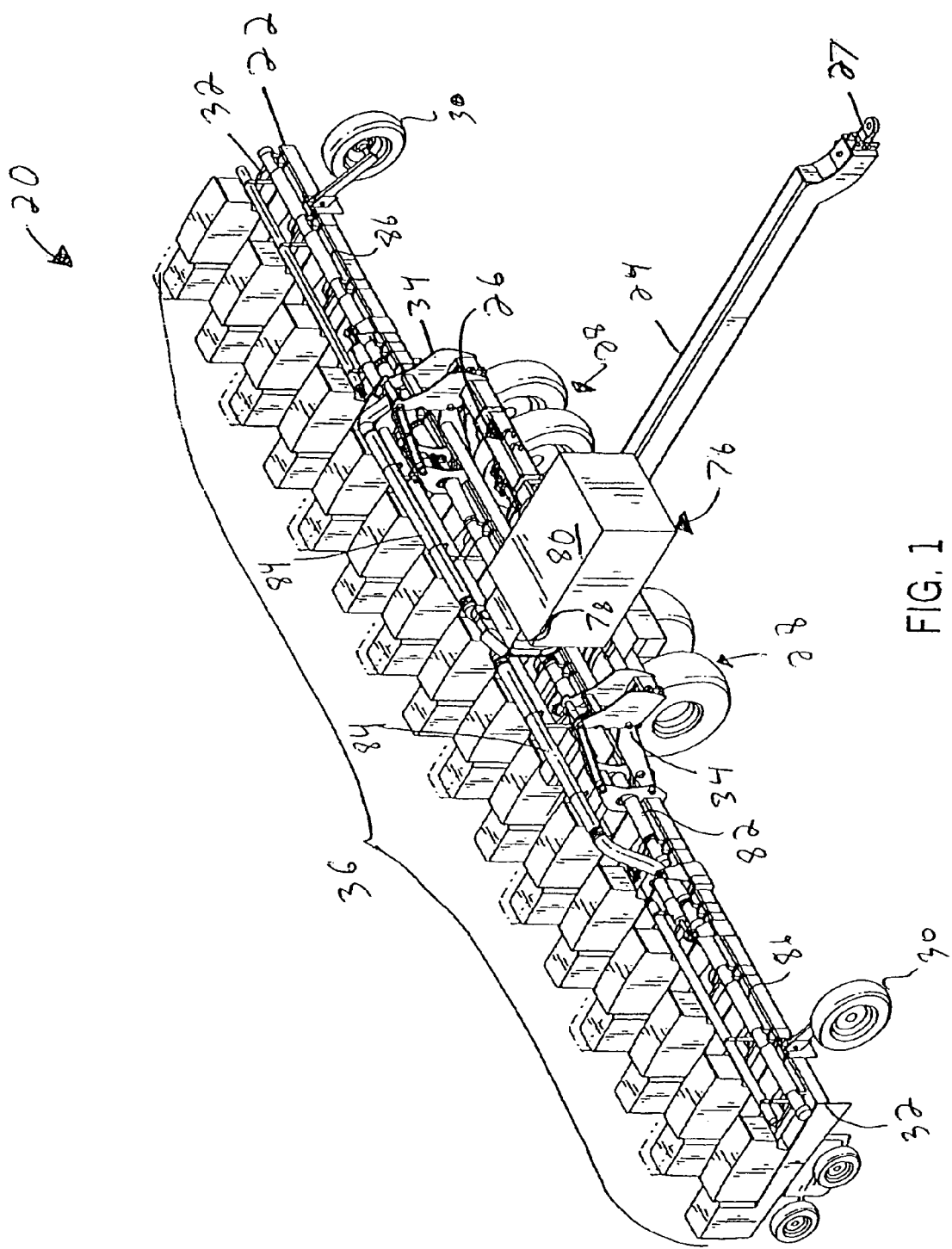
FIG. 1 is a schematic perspective view of a seed planting assembly supporting a plurality of seed planting units constructed in accordance with the preferred embodiment of the invention.

Referring to FIG. 1, a seed planting assembly 20 includes a laterally extending toolbar 22 connected at its middle (or other location) to a forwardly extending tow bar 24. Tow bar 24 includes a connector 27 disposed at its longitudinally forward end and configured to mate with a corresponding hitch, or the like, of a towing tractor (not shown). Toolbar 22 is supported by a chassis 26 that is connected to tow bar 24 via a hinged bracket assembly 34. Chassis 26 is supported on the ground by two pair of wheels 28. Outer portions of tool bar 22 are supported by outer wheels 30 having an adjustable height to thus control the height of toolbar 22.

A plurality of seed planting units (or row units) 36 extends longitudinally rearwardly from toolbar 22. In particular, referring also to FIGS. 2 and 5, each planting unit 36 includes a frame 37 that is connected at its front end 39 to toolbar 22 via a mounting assembly 59. Mounting assembly includes a pair of upper support beams 61 (one illustrated) and a pair of lower support beams 63 (one illustrated) that are hingedly connected to frame 37 at one end, and to a mounting structure 55 at another end. Mounting structure is, in turn, connected to tool bar 22.

Figure 2:
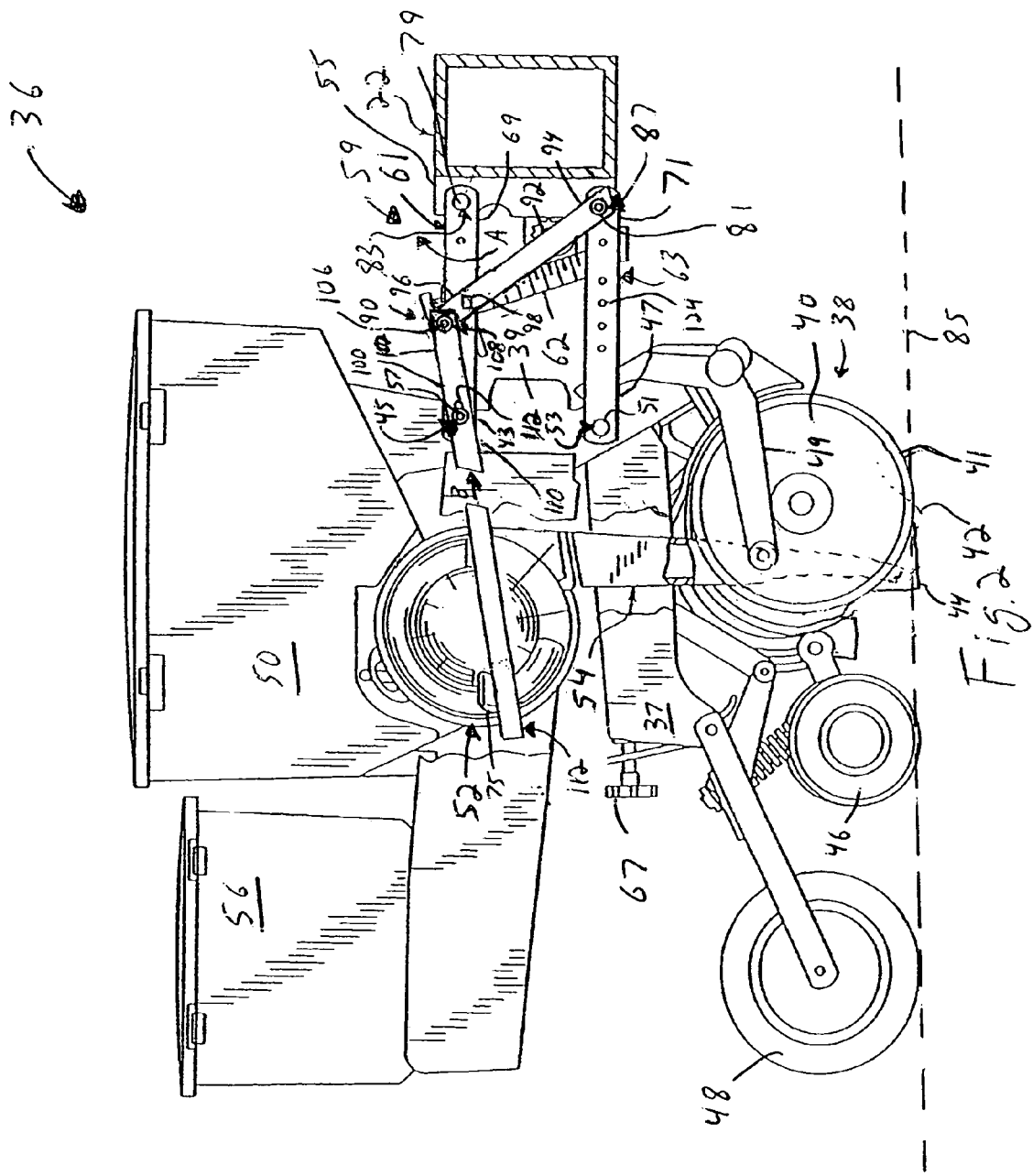
FIG. 2 is a side elevation view of a planting unit illustrated in FIG. 1 incorporating a vertical positioner, wherein the seed planting unit is in a lowered position.

In particular, referring also to FIG. 2, frame 37 defines a front end 39 having a first pair of aligned apertures extending laterally therethrough. Corresponding apertures extend through the rearward ends 43 of each upper support beam 61 to pivotally connect the support beams 61 to frame 37. A pin 57 extends through each pair of aligned apertures and is fastened to provide a joint 45 that enables planting unit 36 to pivot about mounting assembly 59.

Likewise, the front end 39 of frame 37 defines a second pair of laterally extending apertures (not shown) disposed below the first pair of apertures. The second pair of apertures is laterally aligned with corresponding apertures (not shown) extending laterally through the rearward ends 47 of each lower support beam 63. A pin 51 extends through each pair of aligned apertures and is fastened to provide a joint 53 that enables planting unit 36 to pivot about mounting assembly 59.

Each upper support beam 61 further defines a forward end 69 that defines corresponding apertures (not shown) extending laterally therethrough. Likewise, each lower support beam 63 defines a forward end 71 that defines apertures (not shown) extending laterally therethrough. Mounting structure 55 extends rearwardly from tool bar 22, and defines laterally extending apertures (not shown) that are aligned with the apertures extending through forward ends 69 and 71. Upper and lower pins 79 and 81 extend through the corresponding apertures form corresponding joints 83 and 87 that pivotally connect the forward ends 69 and 71 of support beams 61 and 63 to mounting structure 55.

It should thus be appreciated that while the right-hand side of mounting assembly 59 (taken with respect to a view from rear-to-forward) is illustrated as being mounted onto the right-hand laterally outer walls of frame 37, the left-hand side of mounting assembly 59 is likewise mounted onto the left-hand laterally outer walls of frame 37 in a symmetrical and parallel manner with respect to the right-hand side of the mounting assembly. Accordingly, while the left support beams 61 and 63 are connected to the left side of planting unit 36 and mounting structure 55 such that both pairs of beams 61 and 63 are parallel to each other during operation.

As is well-known in the art, planting units 36 are mounted in a side-by-side (lateral) relation relative to each other along the toolbar 22. While sixteen such row units are illustrated in FIG. 1, the present invention contemplates that up to thirty-one or thirty-two row units can be assembled on a single toolbar 22 in accordance with the preferred embodiment. It should be appreciated, however, that any suitable number of row units can be implemented. During operation, forward movement of the tractor causes row units 36 to ride along the ground, forming a plurality of seed trenches that receive seeds and are subsequently closed.

Referring again to FIG. 2, each planting unit 36 preferably includes a conventional seed trench opening assembly 38, each of which including a pair of laterally spaced seed trench opener discs 40 that converge forwardly and downwardly to define a convergence point 41. A seed trench firming point 42 is disposed rearwardly from convergence point 41, and an opener shoe 44 is disposed rearwardly from firming point 42. Firming point 42 preferably extends slightly downwardly from the opener shoe 44, and firms the seed trench that is formed by convergence point 41. The depth of the seed trench can be controlled by a pair of gauge wheels (not shown) that are supported by gauge wheel arms 49, as understood by those having ordinary skill in the art. Alternatively, the planting unit 36 can be provided with a runner opener type for providing a seed trench in the ground as is appreciated by one having ordinary skill in the art. Planting unit 36 further includes a pair of seed trench closer discs 46 disposed rearwardly from opener shoe 44. A press wheel 48 is disposed rearwardly from closure discs 46.

A pair of screw and spring assemblies 62 (one shown) is displaced laterally from each other and extends downwardly from a first support member (not shown) extending laterally between the upper support beams 61 to a second member (not shown) extending laterally between the lower support beams 63. Screw assemblies 62 are angled with respect to support beams 61 and 63, and can thus be actuated in a known manner to increase and decrease the down pressure exerted onto seed trench opening assembly 38 to control downward force on the opening discs, as is well understood by those having ordinary skill in the art. A knob 67 extends rearwardly from frame 37 and can be rotated to adjust the depth of gauge wheels (not shown) which control the desired seed trench depth as appreciated by one having ordinary skill in the art.

Planting unit 36 further includes a seed hopper 50 that provides storage for seed material that is to be gravitationally deposited into the seed trench that is formed as the seed trench opening assembly moves across the field during operation. It should be appreciated, however, that a hopper container, smaller than container 50, can alternatively be connected to a centralized bin or large hopper in a conventional manner. In the illustrated embodiment, seeds are delivered from hopper 50 to a seed metering assembly 52 that acts under vacuum received by connector 75. The received seeds are then delivered into a seed tube 54 at a uniform rate. Seed tube 54 defines a conduit having an outlet end immediately downstream of firming point 42 and upstream of seed trench closer discs 46. Seed tube 54 thus receives seeds from metering assembly and defines a substantially vertical passage through which the seeds are delivered through the opener shoe 44 and into the seed trench. The components of seed metering assembly 52 are further described in U.S. Pat. No. 6,109,193, the disclosure of which is hereby incorporated by reference.

During operation, as the power source or tractor pulls the tool bar 22 across and over the ground, the seed trench opening assembly 38 opens a seed trench in the ground. Seeds from the hopper 50 flow into the seed metering assembly 52 in bulk and are subsequently deposited into the seed trench via seed delivery tube 54 at a controlled rate. The seed trench closer discs 46 trail the seed trench opening assembly 38 and, as the seed planting unit 36 is drawn across the field, close the seed trench together and over the seed dispensed by the seed metering assembly 52. The trailing press wheel 48 compacts the soil closed over the delivered seeds.

Planting unit 36 can also be equipped with a pesticide hopper 56 that is mounted towards a rear end of the planting unit. Hopper 56 preferably includes an insecticide and is provided with conventional dispensing apparatus for applying controlled amounts of insecticide where desired in combination with the planting of seeds by each planting unit 36.

Referring again to FIG. 1, each planting unit 36 can be coupled to an air moving system 76 that includes one or more air moving units (collectively identified as 78) enclosed in one or more housings (collectively identified as 80). While air mover unit(s) 78 are configured to provide negative pressure, they can alternatively function as blower units if a positive pressure seed metering assembly is implemented in planting units 36. Air moving system 76 includes a lower lateral tubing member 82 that is connected at its middle to one of the air moving units 78, and extends laterally outwardly therefrom in both directions. A plurality of openings (not shown) are formed in tubing member 82 that connect to a forward end of a corresponding plurality of flexible intake tubes that, in turn, connect with the corresponding metering assembly connector 75.

A bifurcated arrangement is illustrated with respect to a pair of upper lateral tubing members 84 that are connected at their laterally inner ends to one or more air mover units 78. Tubing members 84 extend parallel to, and are disposed above, tubing member 82, and are connected at their outer ends to outer tubing members 86. Outer tubing members 86 are vertically aligned with lower tubing member 82, and extend across those planting units 36 that are disposed laterally outwardly with respect to lower tubing member 82. A plurality of openings (not shown) are formed in tubing members 86 that connect to a plurality of flexible intake tubes that, in turn, connect with the corresponding metering assembly connectors 75 of laterally outwardly disposed planting units 36.

During operation, air moving units 78 draw air through the metering assemblies 52 of all planting units 36 to which the lateral tubes 82–86 are operably connected. The number of air mover units 78 implemented in a given seed planting assembly depends largely on the number of planting units 36 and the airflow rating of each air mover unit.

The present invention recognizes that certain seed types (for example, soybeans) are well suited to be planted in seed trenches that are laterally spaced a distance equal to the distance between adjacent seed trench opening assemblies 38 of all planting units 36 disposed on tool bar 22. However, in order to accommodate other seed types (for example, corn) that require additional distance between adjacent seed trenches in order to grow properly, it is necessary, from time to time, to raise certain planting units 36 above the ground 85.

It should thus be appreciated that the term "raised position" as used in the present application refers to a position whereby planting unit 36 has been translated upwardly to a height sufficient to cause at least the corresponding seed trench opening assembly 38 (and preferably closer disc 46 and press wheel 48) to become suspended-above the ground 85. Accordingly, raised planting units 36 will not form a seed trench in the ground 85 when the seed planting assembly 20 is driven across the ground 85. In accordance with the preferred embodiment, alternating planting units can be raised from the ground 85, thereby doubling the distance between adjacent seed trenches compared to the distance that is achieved when all planting units are engaged.

FIG. 2 illustrates the planting unit 36 in a lowered position such that seed trench opening assembly 38, closer discs 46, and press wheel 48 are engaged with the ground to enable proper seed planting during operation. During operation, the planting unit 36 can be raised by rotating support beams 61 and 63 clockwise about joints 83 and 87 (in the direction of Arrow A). Conversely, planting unit 36 can be lowered by rotating support beams 61 and 63 counterclockwise about joints 83 and 87 to again lower the planting unit 36. Mounting assembly 59 thus enables planting unit 36 to translate upwardly and downwardly with respect to tool bar 22 and the ground 85.

Figure 5:
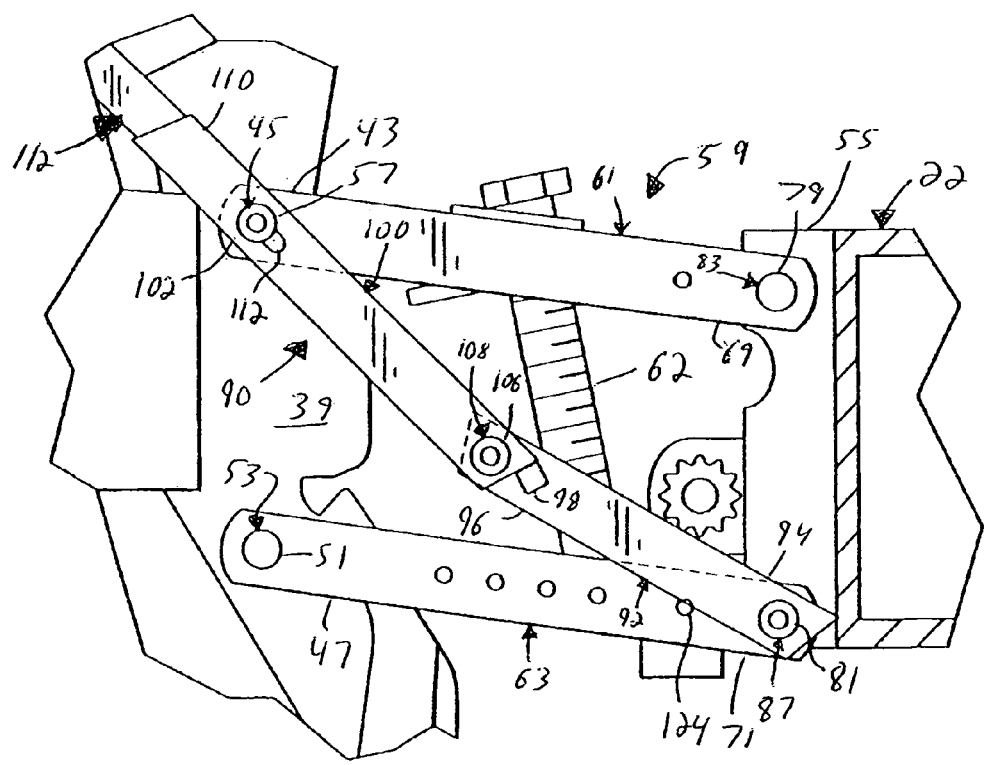
FIG. 5 is a side elevation view of the planting unit illustrated in FIG. 2 in a raised position.

Referring now also to FIG. 5, each planting unit 36 includes a vertical positioner 90 that is connected to mounting assembly 59 to facilitate raising and lowering of the planting unit, and further to automatically lock the planting unit 36 in the raised position, as will now be described.

In particular, vertical positioner 90 includes a first linkage 92 that defines a forward end 94 having an aperture (not shown) extending therethrough that receives pin 81 and is thus pivotally connected to the forward end 71 of lower beam 63 via joint 87. Linkage 92 extends rearwardly, and is angled upwardly, from joint 87 and terminates at a rearward end 96 that defines an aperture (not shown) extending laterally therethrough. A projection 98 extends laterally outwardly from the rearward end 96 of linkage 92, and provides a stop for the vertical positioner 90, as will be described in more detail below.

Vertical positioner 90 further includes a second linkage 100 that defines a forward end 102 defining an aperture (not shown) extending laterally therethrough and aligned with the aperture extending through rearward end 96 of linkage 92. A pin 106 extends through the apertures to form a joint 108 that pivotally connects the forward end 102 of linkage 100 to the rearward end 96 of linkage 92. Linkage 100 extends rearwardly, and is angled slightly downwardly from rear end 96 of linkage 92. Linkage 100 terminates at a rearward end 110 that defines an aperture in the form of an elongated groove 112 that extends laterally therethrough and receives pin 57. Joint 45 thus pivotally connects the rearward end 110 of linkage 100 to the front end 39 of frame 37.

Figure 3:
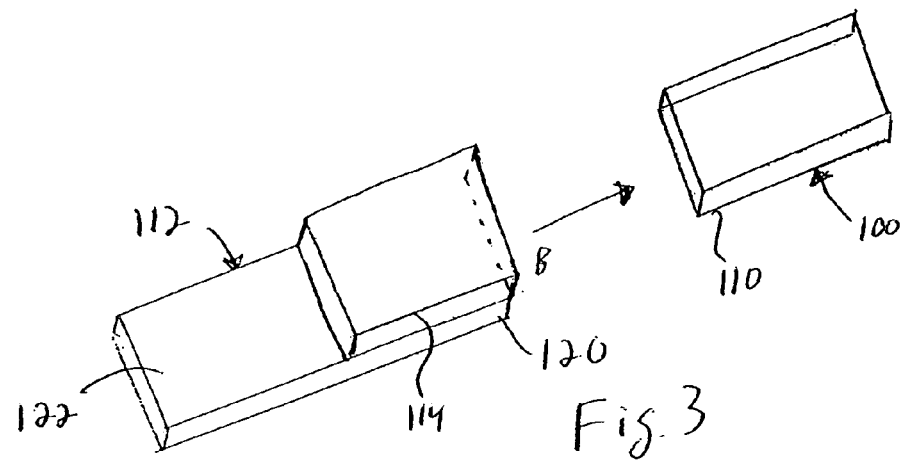
FIG. 3 is a side elevation view of the vertical positioner illustrated in FIG. 2.

Referring now also to FIG. 3, vertical positioner 90 further includes a rectangular lever 112 operable to engage the rearward end 110 linkage 100. In particular, lever 112 defines a channel 114 disposed at its forward linkage-engaging end 120 that is sized to receive rearward end 110 of linkage 100. Lever 112 includes a handle end 122 opposite engaging end 120 that can be gripped by a user to fit the engaging end 120 over end 110 in the direction of Arrow B. It should be appreciated that lever 112 is schematically illustrated, and that handle end 122 can include an ergonomic grip (not shown) if desired. Lever 112 can thus be coupled to linkage 100 to place the lever 112 in operable communication with positioner 90, and can further be removed when the positioner 90 is locked in a lowered or raised position.

When the lever is coupled to linkage 100, the handle end 122 can be actuated to manually pivot lever 112 clockwise in the direction of Arrow C about joint 45, thereby causing planting unit 36 to translate upwardly and joint 108 to translate downwardly to the position illustrated in FIG. 4. Clockwise pivoting of lever 112 causes linkage 100 to also pivot clockwise about joint 45, and further causes link 92 to pivot counterclockwise about joint 87. Rotation of linkages 92 and 100 causes joint 108 to translate downwardly until it is aligned with joints 45 and 87 (and linkages 92 and 100 are in alignment).

Further clockwise pivoting of lever 112 causes joint 108 to snap downwardly over center, at which point the gravitational forces of planting unit 36 further bias joint 108 downwardly. Linkage 100 continues to pivot clockwise until the forward end 102 abuts stop 98, thereby preventing over rotation of linkage 100. Stop 98 is positioned such that the downward gravitational forces of planting unit 36 are sufficient to prevent upward translation of joint 108 during normal use.

When the planting unit 36 is to be lowered, lever 112 is again coupled ti linkage 100 and pivoted counterclockwise against the gravitational forces of the planting unit. Counterclockwise rotation of lever 112 causes linkage 100 to also pivot counterclockwise about joint 45, thereby raising joint 108 over-center, at which point the downward gravitational forces of planting unit 36 assist in raising the joint 108 until seed trench opening assembly 38, closer discs 46, and press wheel 48 again engage the ground 85.

Advantageously, the force required to manually rotate lever 112 is significantly less than the force required to lift planting unit 36 directly. A plurality of apertures 124 extend through lower linkage 63, and are aligned rearwardly from joint 87. Apertures 124 are configured to receive pin 81, such that forward end 94 of linkage 92 can be positioned to form joint 87 at any of the apertures 124. As joint 87 is positioned rearwardly, the force required to rotate linkage 100 increases as does the amount of vertical translation. Apertures 124 thus enable a user to determine the desired location of joint 87 based on a balance between the amount of force required to raise planting unit 36 and the desired raised planting unit height.

While linkage 100 is connected to both upper arm 61 and frame 37 at joint 45, it should be appreciated that rearward end 110 couple be coupled in several locations to place the linkage 100 in operable mechanical communication with the planting unit frame 37 that enables frame 37 to be raised and lowered in the manner described herein. For instance, rearward end 110 could be fastened to frame 37 without being coupled to upper arm 61, or alternatively could be coupled to upper arm 61 without being coupled to frame 37. If rearward end 110 were coupled to upper arm 61 without being coupled to frame 37, the forward positioning of the coupling would determine the amount of force required to raise the frame 37 along with the amount of vertical frame travel.

While the vertical positioner 90 has been illustrated and described as being mounted onto the right-hand side of mounting assembly 59, the present invention recognizes that most users are right handed. Accordingly, vertical positioner 90 can alternatively be mounted onto the left-hand side of mounting assembly 59, such that a user's right hand would naturally engage lever 112, thereby further reducing the difficulty experienced by the user when raising the planting unit 36. In this embodiment, lever 112 would be pivoted counterclockwise (from a view facing the laterally outer ends of the left side of mounting assembly 59) to raise the planting unit 36, and clockwise to lower the planting unit.

It should be appreciated that joint 108 in combination with stop 98 provide an automatic locking mechanism that prevents planting unit 36 from being lowered once raised to its desired position. Accordingly, the present invention overcomes the difficulties associated with raising and locking planting units in accordance with conventional techniques. Advantageously, lever 112 is easily portable, and can be used to actuate each planting unit in an entire row that is to be raised. It should further be appreciated that the rearward end of linkage 100 can alternatively be extended to a length approximately equal to the length of lever 112, thereby enabling linkage 100 to be actuated directly by a user without first having to insert lever 112. The term "lever" as used in this application is thus intended to broadly include both lever 112 and a rearward extension of linkage 100.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A seed planting assembly comprising:
   a laterally extending tool bar;
   a planting unit including a planting unit frame supported by the tool bar, wherein the planting unit frame carries:
   i. a seed trench opening assembly operable to create a seed trench;
   ii. a seed delivery assembly delivering seeds into the seed trench; and
   iii. a seed trench closing assembly operable to close the seed trench;
   a mounting assembly pivotally linking the planting unit frame with the tool bar, wherein the mounting assembly permits the planting unit to raise and lower with respect to the tool bar; and
   a vertical positioner including a first linkage connected to the mounting assembly, and a second linkage connected to the first linkage at a positioner joint and further in communication with the frame, wherein the second linkage can be actuated to raise the planting unit;
   wherein the mounting assembly includes an upper and lower beam member, each of which in communication with the tool bar at a forward end, and in communication with the planting unit frame at a rearward end.

2. The seed planting assembly as recited in claim 1, wherein the first linkage is connected to the lower beam member, and wherein the second linkage is connected to the upper beam member.

3. The seed planting assembly as recited in claim 2, wherein the second linkage is connected to the upper beam member at a location between the planting unit and the positioner joint.

4. The seed planting assembly as recited in claim 2, wherein the first and second linkages are pivotally connected to the mounting assembly.

5. The seed planting assembly as recited in claim 2, wherein the lower beam member defines a plurality of locations spaced along the lower beam and configured to connect to the first linkage.

6. The seed planting assembly as recited in claim 1, wherein the second linkage defines a slot operable to receive an actuating lever.

7. The seed planting assembly as recited in claim 1, wherein the first linkage further comprises a stop that engages the second linkage when the planting unit is raised.

8. The seed planting assembly as recited in claim 1, wherein the first linkage is connected to the lower beam member, and wherein the second linkage is connected to the planting unit.

9. A method for changing a vertical position of a seed planting assembly including 1) a seed trench opening assembly operable to create a seed trench, 2) a seed delivery assembly delivering seeds into the seed trench, and 3) a seed trench closing assembly operable to close the seed trench, the method comprising the steps of:

supporting a planting unit on a tool bar via a mounting assembly that permits the planting unit to raise and lower with respect to the soil;

actuating a lever in communication with the mounting assembly via a vertical position to change the vertical position of the seed planting assembly relative to the tool bar;

wherein the mounting assembly is in pivotal communication with the tool bar at a forward end, and in pivotal communication with the planting unit at a rearward end;

further comprising placing the lever in pivotal communication with the mounting assembly;

further comprising actuating a vertical positioner including a first linkage connected to the mounting assembly and a second linkage connected to the planting unit, wherein the first and second linkages join at a positioner joint;

further comprising engaging the second linkage with a stop disposed on the first linkage when the planting unit is raised.

10. A method for changing a vertical position of a seed planting assembly including 1) a seed trench opening assembly operable to create a seed trench, 2) a seed delivery assembly delivering seeds into the seed trench, and 3) a seed trench closing assembly operable to close the seed trench, the method comprising the steps of:

supporting the planting unit on a tool bar via a mounting assembly that permits the planting unit to raise and lower with respect to the soil;

actuating a lever in communication with the mounting assembly via a vertical position to change the vertical position of the seed planting assembly relative to the tool bar;

wherein the mounting assembly is in pivotal communication with the tool bar at a forward end, and in pivotal communication with the planting unit at a rearward end;

further comprising placing the lever in pivotal communication with the mounting assembly;

further comprising actuating a vertical positioner including a first linkage connected to the mounting assembly and a second linkage connected to the planting unit, wherein the first and second linkages join at a positioner joint;

wherein the mounting assembly further comprises upper and lower beam members in communication with the tool bar at a forward end, and in communication with the planting unit at a rearward end;

further comprising engaging the first linkage with one of a plurality of mounting locations disposed on the lower beam member.

\* \* \* \* \*